United States Patent
Fleureau et al.

(10) Patent No.: US 10,440,446 B2
(45) Date of Patent: Oct. 8, 2019

(54) METHOD FOR GENERATING HAPTIC COEFFICIENTS USING AN AUTOREGRESSIVE MODEL, SIGNAL AND DEVICE FOR REPRODUCING SUCH COEFFICIENTS

(71) Applicant: THOMSON LICENSING, Issy les Moulineaux (FR)

(72) Inventors: Julien Fleureau, Rennes (FR); Fabien Danieau, Rennes (FR); Philippe Guillotel, Vern sur Seiche (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 173 days.

(21) Appl. No.: 15/038,245

(22) PCT Filed: Nov. 21, 2014

(86) PCT No.: PCT/EP2014/075302
§ 371 (c)(1),
(2) Date: May 20, 2016

(87) PCT Pub. No.: WO2015/075191
PCT Pub. Date: May 28, 2015

(65) Prior Publication Data
US 2016/0295302 A1    Oct. 6, 2016

(30) Foreign Application Priority Data
Nov. 25, 2013    (FR) .................... 13 61578

(51) Int. Cl.
*H04N 21/81*    (2011.01)
*H04N 21/235*    (2011.01)
(Continued)

(52) U.S. Cl.
CPC ....... *H04N 21/8133* (2013.01); *H04N 21/235* (2013.01); *H04N 21/4131* (2013.01);
(Continued)

(58) Field of Classification Search
CPC ............. H04N 21/235; H04N 21/4131; H04N 21/4307; H04N 21/435; H04N 21/8133; H04N 21/84
(Continued)

(56) References Cited

U.S. PATENT DOCUMENTS

2005/0166101 A1*  7/2005  Alexandre ........... G10H 1/0058
                                                              714/700
2009/0096632 A1*  4/2009  Ullrich ............... H04N 21/8547
                                                              340/4.21
(Continued)

FOREIGN PATENT DOCUMENTS

| WO | WO03089100 | 10/2003 |
| WO | WO2009051428 | 4/2009 |
| WO | WO2011136763 | 11/2011 |

OTHER PUBLICATIONS

Sakr N et al. "Motion and Force Prediction in Haptic Media": Jul. 1, 2007, Multimedia and Expo, 2007 IEEE pp. 2242-2245, XP3112407.*
(Continued)

Primary Examiner — Brian T Pendleton
Assistant Examiner — Alan H Luong
(74) Attorney, Agent, or Firm — Tutunjian & Bitetto, P.C.

(57) ABSTRACT

The invention relates to a method for generating haptic coefficients associated with an audiovisual document. Initially, data is extracted from an audio and/or video track and is used to calculate at least one first group of haptic coefficients from an autoregressive model applied to the read data. These haptic coefficients are designed to program a filter supplying at the output the control parameters for
(Continued)

Figure 1:
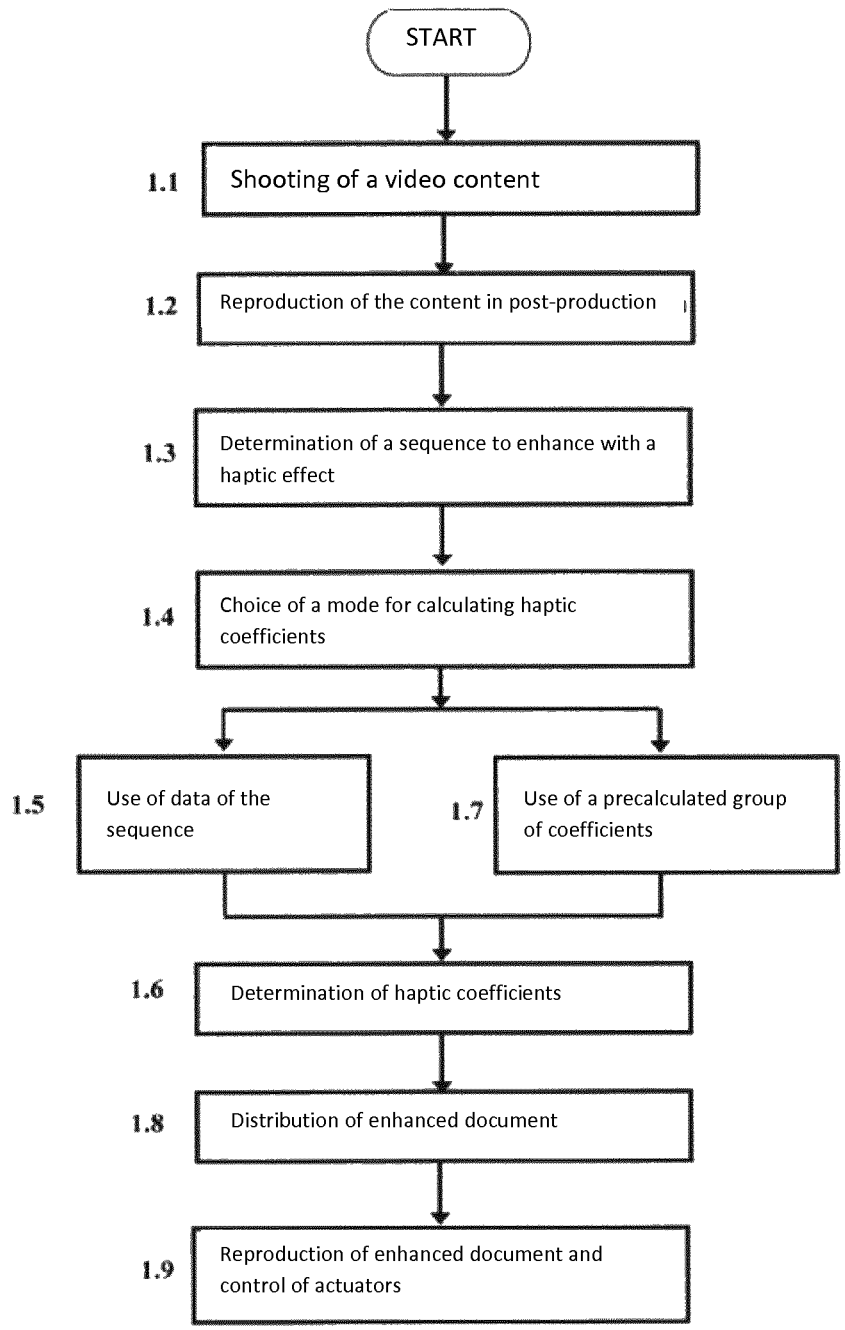

controlling at least one haptic actuator. Then, a "haptic" sequence of the audiovisual document is determined and calculated haptic parameters are associated with the determined sequence. In this manner, the haptic parameters enabling the control of one or more actuators are easily calculated and easily reproducible. Advantageously, the data used for the calculation is extracted from the selected sequence.

9 Claims, 4 Drawing Sheets

(51) Int. Cl.
*H04N 21/41* (2011.01)
*H04N 21/43* (2011.01)
*H04N 21/435* (2011.01)
*H04N 21/84* (2011.01)

(52) U.S. Cl.
CPC ....... *H04N 21/435* (2013.01); *H04N 21/4307* (2013.01); *H04N 21/84* (2013.01)

(58) Field of Classification Search
USPC ................ 345/156–157, 173; 725/9, 12, 32; 340/407.1
See application file for complete search history.

(56) References Cited

U.S. PATENT DOCUMENTS

| | | | | |
|---|---|---|---|---|
| 2011/0215913 | A1* | 9/2011 | Ullrich | G06F 3/016 340/407.1 |
| 2012/0281138 | A1* | 11/2012 | Choi | H04N 21/235 348/460 |
| 2015/0070150 | A1* | 3/2015 | Levesque | G06F 3/016 340/407.1 |
| 2015/0070152 | A1* | 3/2015 | Rank | H04N 21/235 340/407.1 |
| 2015/0100669 | A1* | 4/2015 | Yang | H04N 21/23 709/219 |

OTHER PUBLICATIONS

Sakr N et al. "Motion and Force Prediction in Haptic Media": Jul. 1, 2007, Multimedia and Expo, 2007 IEEE pp. 2242-2245, XP3112407 (Year: 2007).*

Sakr et al., "Motion and Force Prediction in Haptic Media", 2007 IEEE International Conference on Multimedia & Beijing, China, Jul. 2, 2007, pp. 2242-2245.

Ott et al., "MHaptic: a Haptic Manipulation Library for Generic Virtual Environments", 2007 International Conference on Cyberworlds, Hannover, Germany, Oct. 24, 2007, pp. 338-345.

Tang et al., "On Supporting Collaborative Haptic Interactions with Physically-Based 3D Deformations", 2010 IEEE International Symposium on Haptic Audio-Visual Environments and Games, Phoenix, Arizona, USA, Oct. 16, 2010, pp. 1-6.

Culbertson et al., "Refined Methods for Creating Realistic Haptic Virtual Textures from Tool-Mediated Contact Acceleration Data", 2012 IEEE Haptics Symposium, Vancouver, British Columbia, Canada, Mar. 4, 2012, pp. 385-391.

Danieau et al., "A Framework for Enhancing Video Viewing Experience with Haptic Effects of Motion", 2012 IEEE Haptics Symposium, Vancouver, British Columbia, Canada, Mar. 4, 2012, pp. 541-546.

Gaw et al., "Haptically Annotated Movies: Reaching Out and Touching the Silver Screen", IEEE Symposium on Haptic Interfaces for Virtual Environment and Teleoperator, Systems, Arlington, Virginia, USA, Mar. 25, 2016, pp. 287-288.

Israr et al., "Tactile Brush: Drawing on Skin with a Tactile Grid Display", ACM Conference on Human Factors in Computing Systems, Vancouver, British Columbia, Canada, May 7, 2011, pp. 2019-2028.

Kim et al., "A Tactile Glove Design and Authoring System for Immersive Multimedia", IEEE Multimedia, vol. 17, No. 3, Jul.-Sep. 2010, pp. 34-45.

Hayes, M., "Statistical Digital Signal Processing and Modeling", John Wiley & Sons, Inc., New York, 1996, pp. 1-622.

Rahman et al., "Adding Haptic Feature to YouTube", ACM International Conference on Multimedia, Firenze, Italy, Oct. 25, 2010, pp. 1643-1646.

Ryu et al., "posVibEditor: Graphical Authoring Tool of Vibrotactile Patterns", 2008 IEEE International Workshop on Haptic Audio Visual Environments and Games, Ottawa, Canada, Oct. 18, 2008, pp. 120-125.

Takeuchi et al., "Haptic Duplicator", 2012 Virtual Reality International Conference, Laval, France, Mar. 28, 2012, pp. 1-2.

* cited by examiner

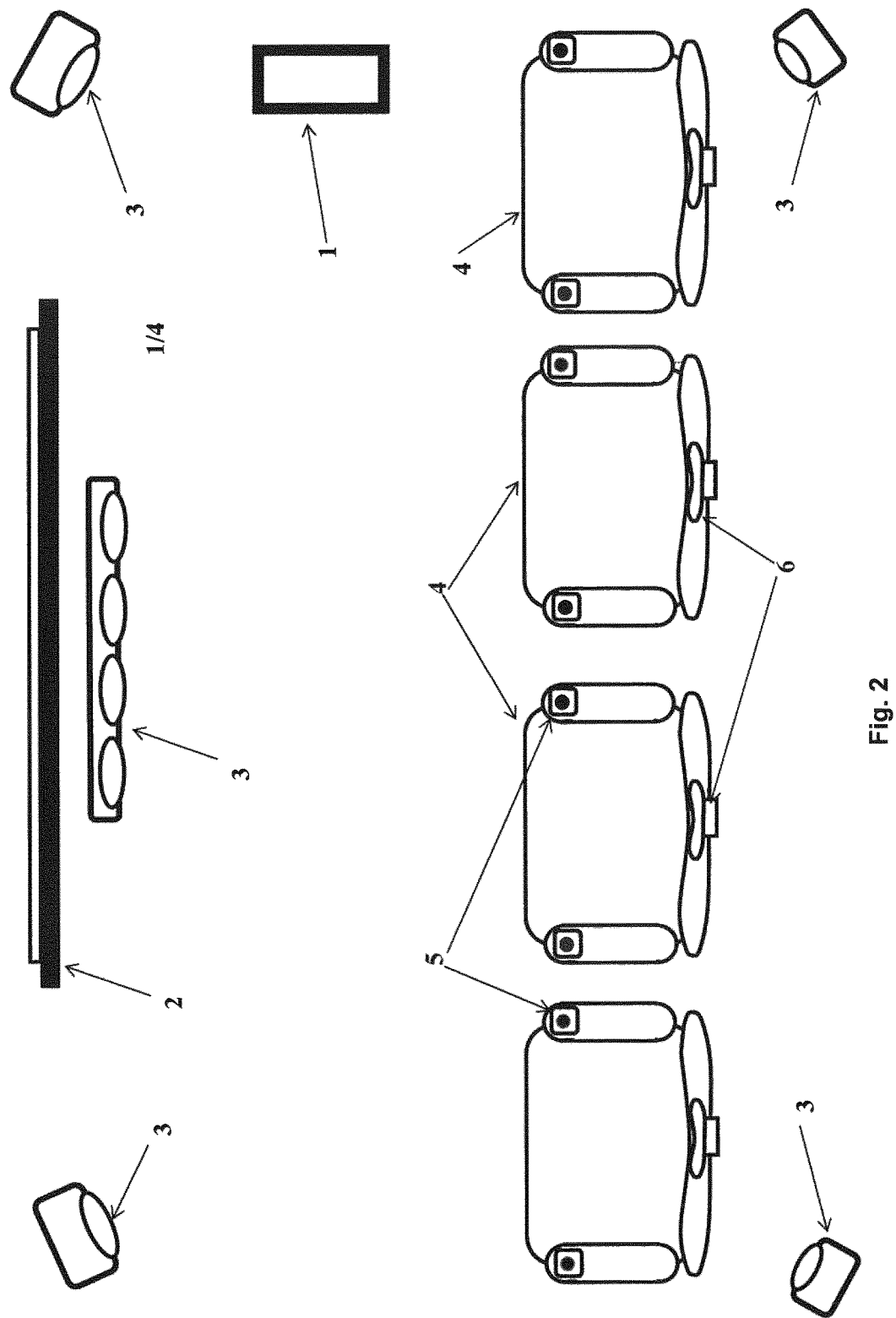

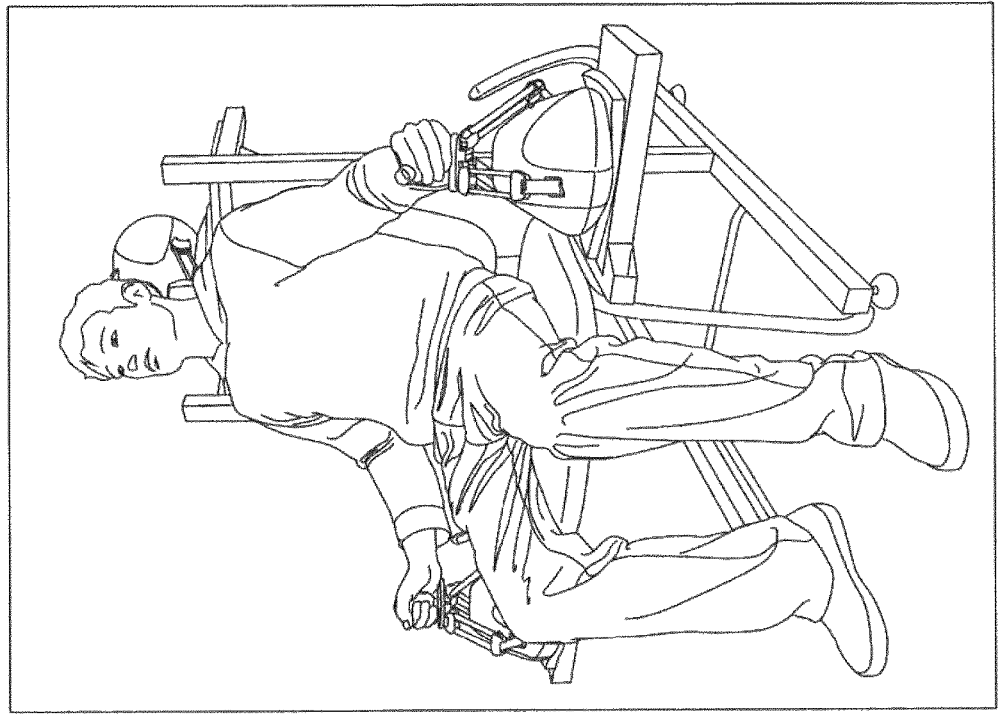
Fig. 3.b
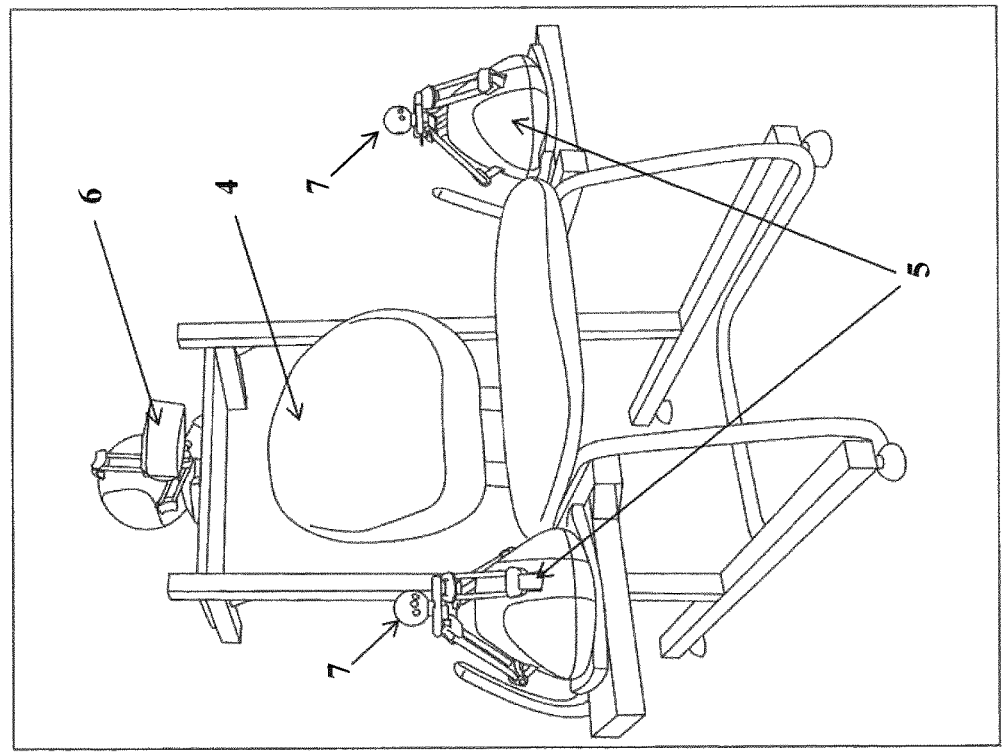
Fig. 3.a

METHOD FOR GENERATING HAPTIC COEFFICIENTS USING AN AUTOREGRESSIVE MODEL, SIGNAL AND DEVICE FOR REPRODUCING SUCH COEFFICIENTS

This application claims the benefit, under 35 U.S.C. § 365 of International Application PCT/EP2014/075302, filed on Nov. 21, 2014, which was published in accordance with PCT Article 21(2) on May 28, 2015 in English and which claims the benefit of French patent application No. 1361578 filed on Nov. 25, 2013.

1. TECHNICAL FIELD

The domain of the present disclosure is that of the generation of haptic coefficients designed to be used during the reproduction of an audiovisual content. More specifically, the present disclosure relates to the use of an autoregressive model for producing haptic actuator control signals.

2. BACKGROUND ART

Nowadays, motion picture techniques can enrich the audiovisual document and what the spectator feels. Equipment is added to the seat on which the spectator is sitting to provide them with other sensations than those provided by sight and hearing. Hence, the seats can now move along several axes of freedom causing the spectator to move in relation to the visual and/or audio content. The spectator perceives synchronised sensations with images and/or sounds present in the audiovisual document. His immersion in the reproduction of the document is thus greater and his impression of living the event more intense. For example, in the case of a film shot at the front of a roller coaster, when a drop is reproduced on the screen of the cinema, the seat of the spectator moves slightly forward. Another example consists in strongly vibrating the seats of the cinema from left to right during the reproduction of a scene.

The audiovisual contents with haptic enhancement are used to control actuators that move the spectator during the reproduction of the document. During the reproduction, the different audio tracks, video, text to insert, etc. are read. In the case of a document with haptic enhancement, a track being part of the audiovisual document contains the parameters defining the haptic effect to generate. These parameters are a list of commands to apply to the different actuators available by the spectator during the reproduction of the document.

Most frequently, the haptic enhancements are added for films already realised. An operator views the film and determines a sequence whose perception would be reinforced for the spectator by a movement carried out on his person. The operator determines manually the movement type (movement, vibration, ticking, trepidation, etc.) and programmes the activation of specific actuators during this sequence. The haptic parameters are added to the video signals and possibly audio on a specific support. During the reproduction, the haptic parameters are read and transmitted to the actuators responsible for applying stimuli to the spectator. These stimuli can generate all sorts of sensations: well-being, fear, confidence, smallness, dizziness, etc.

Currently, these haptic parameters are calculated manually by an operator viewing the video or audiovisual document. There is therefore a real need for a new technique able to automate the creation of haptic actuator control parameters and the enhancement of new video documents.

3. SUMMARY

The present disclosure proposes a new solution that resolves at least one of these problems of the background art, in the form of a method of rendering an haptic effect, wherein the method comprising:
receiving a first information representative of a duration and a second information representative of at least one coefficient representative of the haptic effect to be rendered,
generating a signal representative of the haptic effect to be rendered, said signal being generated from an Auto-Regressive filter using said second information and a white noise having a duration depending from said first information.

The present disclosure also relates to a haptic coefficient generation method associated with an audiovisual document comprising data tracks. The method comprises:
a step for reading data extracted from a data track and a step for calculating at least one group of haptic coefficients from said read data, said coefficients being calculated from an autoregressive model applied to said read data and designed to programme a filter supplying the control parameters at the output for controlling a haptic actuator,
a step for determining a sequence called "haptic" of the audiovisual document,
a step for associating haptic coefficients calculated in the determined sequence and a step for incorporating haptic coefficients calculated in a haptic track of the audiovisual document.

In this manner, an operator in post production does not need to manually determine the control parameters of the actuators, the coefficients thus calculated can be directly used by the reader to generate the control signals of the actuators using a filter programmed by said coefficients.

According to a first embodiment, the audio and/or video data analysed for generating the haptic coefficients is extracted from the determined sequence. In this way, the coefficients thus calculated are perfectly suitable to the associated sequences.

According to another embodiment, the method comprises a selection step of a part of the sequence, the audio and/or video data analysed for generating the haptic coefficients is extracted from this part. In this manner, the calculation of the coefficients is facilitated.

According to another embodiment, the haptic coefficients are extracted from a library of coefficients obtained from an analysis of sequences coming from other audiovisual documents. In this manner, the coefficients are precalculated from a sequence adapted to the haptic effect to generate which improves the sensations felt during its reproduction of the document.

According to another embodiment, the method comprises a step for reproducing the determined audiovisual document during which the coefficients associated with the haptic sequences are applied to at least one filter with a view to generating haptic commands to a least one haptic actuator during the reproduction of said sequences. In this manner a spectator receives more sensations by visualising and by listening to the document.

According to another embodiment, the method also comprises a step for associating groups of haptic coefficients with different actuators, the groups being included in the haptic track of the audiovisual document. During the reproduction step, as many filters as groups of haptic coefficients are programmed. The haptic controls thus generated by each filter are transmitted to the corresponding actuators. In this manner, the spectator perceives the vibrations associated with the document by means of several actuations.

According to another embodiment, the method comprises a step for associating different types of actuators with groups of haptic coefficients among a plurality of groups. The plurality of groups is included in the haptic track of the audiovisual document. During the reproduction of the document, a group of coefficients is selected from said plurality according to the actuator types, and the haptic controls thus generated are transmitted to the corresponding actuator. In this manner, the same document can be reproduced on systems having different actuators.

According to another aspect, the invention relates to a system for reproducing at least one audiovisual document containing at least one audio and/or video data track, comprising means for reading said audio and/or video data and at least one haptic actuator. This system comprises:
- a filter receiving white noise at the input and programmed with a group of haptic coefficients read from a haptic track of said document, said coefficients being calculated from an autoregressive model applied to the audio and/or video data,
- means for transmitting output signals of the filter to at least one haptic actuator during the reproduction of a sequence of the audio or video content associated with said coefficients read from the haptic track.

According to a further aspect, the invention relates to a reproduction signal of an audiovisual document. This signal comprises at least one audio or video data track and one track containing a group of haptic coefficients, said coefficients being calculated from an autoregressive model applied to audio and/or video data, said coefficients being intended to programme a filter receiving white noise at the input and generating values designed to control haptic actuators during the reproduction of said audiovisual document.

4. LIST OF FIGURES

Figure 4:
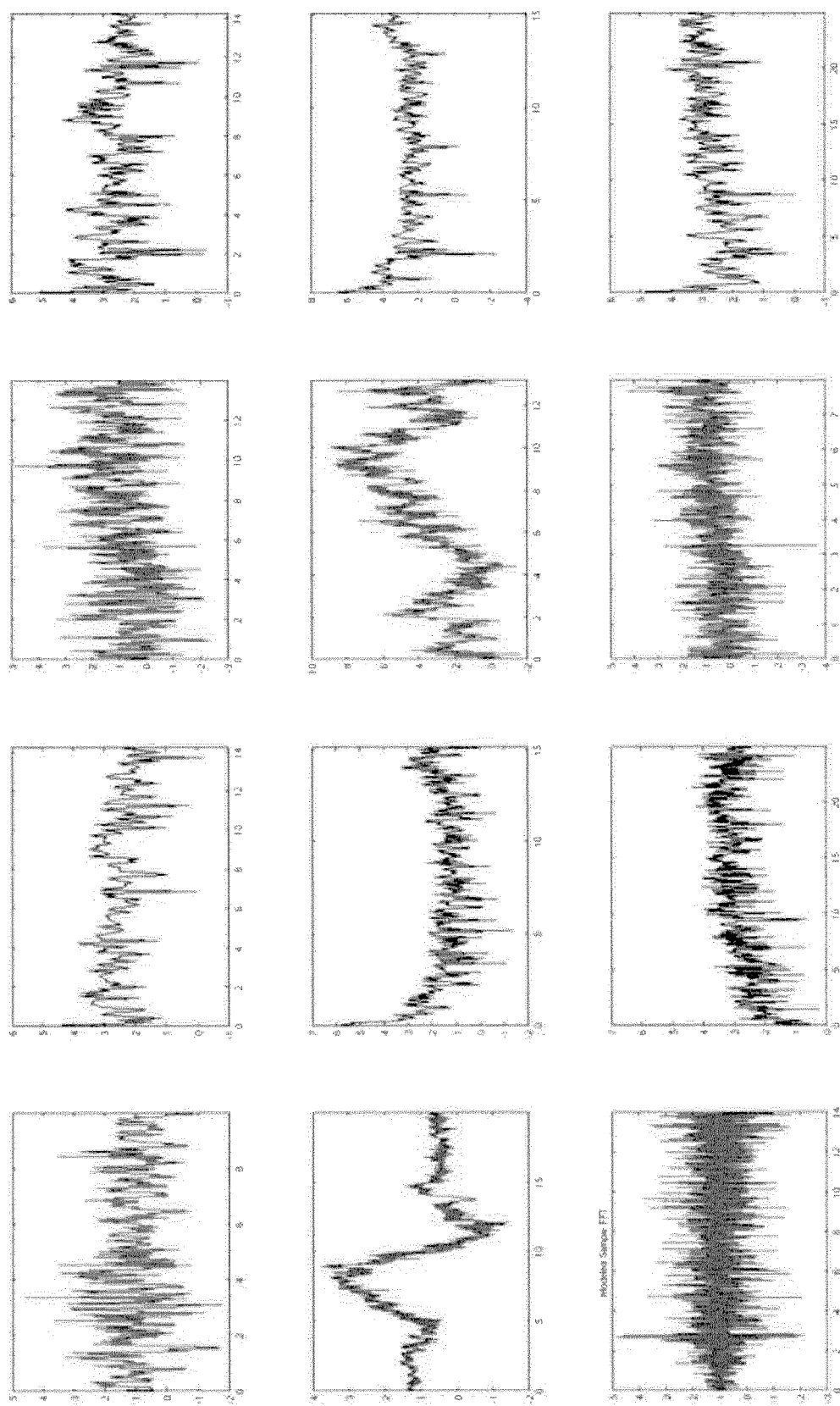

Other characteristics and advantages of the present disclosure will emerge more clearly upon reading the following description of a particular embodiment, provided as a simple illustrative non-restrictive example and referring to the annexed drawings, wherein:

FIG. 1 shows an example of a flowchart of steps for implementing the method, according to a particular embodiment, FIG. 2 shows a diagram of an example of a system for reproducing audiovisual documents and for controlling haptic actuators, FIG. 3.a and 3.b show an example of a seat occupied or not occupied by a spectator and fitted with haptic actuators, FIG. 4 shows a succession of examples of frequency signals at the input and the output of a filter programmed by haptic coefficients.

5. DETAILED DESCRIPTION OF EMBODIMENTS

According to a non-limitative embodiment of the present disclosure, a method for generating haptic coefficients associated with an audiovisual document is described. Initially, data is extracted from an audio and/or video track and is used to calculate at least one first group of haptic coefficients from an autoregressive model applied to said read data. These haptic coefficients are designed to program a filter supplying at the output the control parameters for controlling at least one haptic actuator. Then, a "haptic" sequence of the audiovisual document is determined and calculated haptic parameters are associated with the determined sequence. In this manner, the haptic parameters enabling the control of the actuators are easily calculated and easily reproducible. Advantageously, the data used for the calculation is extracted from the selected sequence.

FIG. 1 shows an example of a flowchart of steps for the implementation of the method according to a particular non-restrictive embodiment of the present principles.

Initially, in step 1.1, a video or audiovisual content is produced according to a first version that contains at least one video track and at least one audio track. From this first version, it can be interesting to enhance it by adding haptic elements that it does not already have. This addition step particularly occurs in the post-production phase, a phase during which dubbing and subtitling are also added. For this, during step 1.2, an operator reproduces the video or audiovisual document and the operator and/or system determines the sequences (at least one) that can be associated with a haptic effect. For example, a scene of a film can be shot in a train running on a railway track, the regular shaking due to the movement are reproduced by haptic actuators during the viewing of the film in a cinema or an individual's home.

In step 1.3, it is determined (for example by an operator or automatically by a system) precisely the start and the end of the sequence to enhance and decide what is the haptic effect to add. In a simple context, the actuators used during the reproduction of the enhanced document are vibration generators integrated into the seat on which the spectator is sitting. Such an actuator is controlled by an analogue or digital signal transmitted by the reproduction unit. According to the present embodiment, the actuators are controlled from haptic coefficients calculated during a production stage of the final document and associated with certain sequences of the document.

According to a first embodiment, the data of the sequence already present in the initial document is used to calculate the haptic coefficients that will then be associated with this sequence. The operator and/or the system selects this first embodiment by introducing a command in a selection menu (step 1.4). According to this first embodiment, in step 1.5, the operator and/or system selects the type of data used to calculate the haptic coefficients, for example: audio, video, haptic. The haptic type means that the haptic data was recorded during the shooting of the document, using sensors such as an accelerometer, a gyrometer or a magnetometer. In the same way as the audio and video data, this data is not directly exploitable for controlling the haptic actuators during the reproduction of the document. This is why it is necessary to process them, for example as described with respect to step 1.6, to generate haptic coefficients from them that will be used to generate commands to the actuators.

In step 1.6, the haptic coefficients are calculated. For this, the spectral content of the data selected is modelled with an autoregressive filter (more commonly called "AR" for short). An autoregressive model is characterised by an equation having a transfer function linking an input $u(k)$ to an output $x(k)$. The z transform of such a function is calculated as follows:

$$X(z) = -\sum_{i=1}^{p} a_i z^{-i} \times X(z) + U(z)$$

$$X(z) \times \left(1 + \sum_{i=1}^{p} a_i z^{-i}\right) = U(z)$$

The transfer function is expressed by the equation:

$$H(z) = \frac{X(z)}{U(z)} = \frac{1}{1 + \sum_{i=1}^{p} a_i z^{-i}}$$

The output of such a filter depends upon previous samples of the output and the current sample of the noise. Coefficients $a_i$ operate only on the previous samples of the output. A 1 Hz characteristic frequency and 20 Hz samples can be taken to capture a spectral content with minimum quality. According to an embodiment, a hundred coefficients are calculated, the value of 128 (that is a power of 2) is used for example. Several methods are known on calculating the coefficients of an autoregressive filter. Among them, the calculation method by resolution of the Yule Walker equation can be cited. Three calculation modes are described hereafter for example:

Mode I: the function is called by giving it only the samples of the signal to model. The function studies the variation in different criteria and specifies the ideal order for each one. It returns all the coefficients calculated without taking into account the minimisation. This mode can see the differences between each criterion.

Mode II: the function is called by giving it the samples of the signal as well as the criterion to minimise. The function minimises the criterion and returns the coefficients of the model associated with this coefficient.

Mode III: the function is called by giving it the samples of the signal as well as the order required for the model. No error minimisation is made, the coefficients are returned directly.

Once the haptic coefficients are calculated, in step 1.6, they are grouped and associated with the sequence to enhance. The succession of coefficient groups constitutes a haptic track that can be accessed within the audio or audiovisual document. At this stage in the generation, the document comprises at least one video track, audio tracks, a haptic track and additional elements for dubbing and subtitling for example.

According to a second embodiment, the operator and/or system chooses, in step 1.4, to select the group of coefficients in a library of haptic coefficients (step 1.7). The coefficients saved in this library were calculated from audio and/or video data extracted from sequences that are found in other audiovisual documents, called second audiovisual documents. In other words, the library includes at least one second group of coefficients calculated from data extracted from a sequence or sequences of at least one second audiovisual document. For example, a film contains a scene shot in a train and the quality of the audio data enables good haptic coefficients to be calculated. In this case, the operator and/or system runs the calculation of haptic coefficients by determining the start and the end of the sequence to analyse and save the group of coefficients calculated in the library. The group is thus identified by the type of haptic effect generated and possibly additional elements such as:

identifier of the document of the sequence analysed,
location in the document of the sequence analysed,
duration of the sequence analysed,
size of the filter to use with these parameters,
. . . .

The use of an autoregressive model enables the calculating of haptic coefficients generating an effect whose duration is not limited in time. For example, suppose that the initial sequence last for 20 seconds, the haptic coefficients generated by this sequence can be used for a much longer period, 50 seconds for example. This is why, according to one embodiment, it is possible to use coefficients calculated from a certain audiovisual sequence, for other sequences of the same document or another document. The operator and/or the system chooses a sequence particularly well adapted to the generation of the coefficients of a certain haptic effect for putting in the library the group of coefficients thus calculated and then using them for other sequences. You can thus observe that the groups of haptic coefficients put in the library can be used irrespective of the duration of the haptic effect that is required to be generated at the moment of the reproduction. Moreover, the haptic effect is characterised by a small number of coefficients, around ten at the most, and thus the place occupied in the document by the haptic enrichment is very small.

According to an improvement that can be used in the first embodiment, the operator and/or system selects a part of the sequence to enrich and calculate haptic coefficients by using the data of this part. In this manner, the operator and/or the system can select a part in which the quality of the data is good, for example a sound track where you distinctly hear the noise of running but no dialogue, and use it to calculate relevant coefficients. The selection of this part is carried out by introducing with a great precision the start and the end of this part within the sequence.

Once the document is enhanced with its haptic track, it is proposed for sale and distributed to many users (step 1.8). The document is presented as a multimedia content file, it can be downloaded from a server or transmitted in the form of a CD or a DVD, a Blue-Ray, etc.

Reproduction of a Document Enhanced with Haptic Effects

A user acquire a document enhanced and, in step 1.9 starts its reproduction in a player connected to actuators.

FIG. 2 shows a diagram of a device for reproducing video documents and for controlling haptic actuators. This device is generally installed in a room dedicated to the reproduction of such documents, such as a cinema for example, but the invention also covers the case of domestic installation receiving audiovisual documents enhanced with parameters designed to command haptic actuators. According to a preferred embodiment, such a device comprises:

a player 1 of audiovisual documents enriched, this player can read DVD or Blue Ray, or contain a hard disk in which such documents are downloaded, a reproduction screen 2 that can be a flat screen, or a video projector projecting images onto a screen, at least one sound reproduction means 3, typically acoustic speakers disseminated in the room, at least one haptic seat 4 arranged opposite the screen 2, this seat comprising for example two hand actuators 5 and an head actuator 6.

During the reproduction of a haptic document, the player 1 reads the different tracks and notably: audio, video and haptic and generates the signals to send to the reproduction screen 2, acoustic speakers 3, and all the haptic seats 4. The data can be transmitted by cables connecting these different elements or by radio or infra-red waves.

The player has a software module designed to run a programmed filter with the haptic coefficients calculated by the autoregressive model. When the player detects, on the haptic track, a group of coefficients associated with a sequence that will very soon be reproduced, it programs the filter with the haptic coefficients associated with this sequence and introduces a white noise at the input. When the sequence begins, the player 1 sends the signals at the output of the filter to the different actuators. In the example described in FIG. 2, the actuators vibrate in the same manner according to frequencies produced by the filter executed in the player 1. The perception of the document that is provided by what the spectator sees and hears, is enhanced by the vibrations that the spectator perceives through his body.

FIGS. 3.*a* and 3.*b* shows a haptic seat 4 that can be used during the reproduction of a document enriched by a haptic track according to an exemplary embodiment of the present principles. This seat comprises a seat and a backrest. A hand actuator 5 is placed on each side of the seat at a position that the spectator can easily grip. A third "head" actuator 6 is placed at the headrest. The head actuator 6 comprises a cross-shaped cushion, in the hollow of which the spectator rests his head. The position of each actuator at the level of the seat 4 is adjusted to be adapted to the size and body shape of each spectator. FIG. 3.*b* shows a spectator seated, having in each has the knob of an actuator 5 and resting his head on the cushion of the third actuator 6. FIG. 3.*a* and 3.*b* are only cited as illustrative examples, many other models of actuators than the one represented in the figure can vibrate the armrests, or plates on which the spectator rests his feet, or any other element in contact with the body of the spectator.

The FIG. 4 presents examples of data values and their frequency breakdowns before and after the autoregressive modelling. 12 oscillograms are shown in the form of 3 rows of 4 images. The first image of each row shows the amplitude values of a particular data item of the audiovisual document, namely the original signal of an audio track, according to time. The first row shows an audio sequence taken during the use of a bicycle, the second is taken next to a car and the third from a roller coaster car. The second image of each row represents the FFT (Fast Fourier Transform) of the signal of the image immediately to the left, that is its spectral content. The third image of each row represents the content generated by the AR modelling of the original signal. The fourth image of each row represents the FFT of the content generated by the filter programmed with the haptic coefficients and receiving white noise at the input. You can thus note the similarities between the frequencies of the original signal and the frequencies present in the signal modelled by the filter.

According to an improvement, the operator and/or the post-production system specifies a rise in the haptic effect and a fall in said effect. The rise time is the time during which the haptic effect starts from a null amplitude to a maximum amplitude. Likewise, the fall time is the time during which the haptic effect starts from the maximum amplitude to reach the null amplitude.

According to an improvement of the present invention, the operator and/or the post-production system specifies a plurality of actuators and of movements of freedom for each actuator. A set of group of coefficients is thus calculated in the step 1.6, each group is associated with an actuator or with movements of freedom of an actuator. During the reproduction, the player 1 reads the set of group of coefficients, programmes as many filters as actuators to control, applies a white noise at the input of each of them and sends the signals supplied by said filters to the actuators associated with these signals.

While the present disclosure was described in reference to particular illustrated embodiments, said invention is in no way limited to these embodiments, but only by the appended claims. It will be noted that changes or modifications can be made by those skilled in the art to the previously described embodiments, without falling outside the scope of the present disclosure.

According to a non-restrictive embodiment, the present disclosure also relates to a method for rendering an haptic effect, for example a vibrational haptic effect, comprising the following steps:
  Selection of at least one part of an audiovisual document,
  Association of a model representing the haptic effect at said at least one part of the audiovisual document selected, the model being represented by a finite number of coefficients.
  Rendering of the haptic effect by supplying at the input of the model a signal representative of a white noise of duration equal to the duration of the at least one part of the audiovisual document.

According to another non-limitative embodiment, the present disclosure also relates to a method for rendering an haptic effect, comprising:
  receiving a first information representative of a duration and a second information representative of at least one coefficient representative of the haptic effect to be rendered,
  generating a signal representative of the haptic effect to be rendered, the signal being generated from an Auto-Regressive filter using said second information and a white noise having a duration depending from said first information.

The signal may then be transmitted to one or several haptic actuators to render the haptic effect, for example the haptic seat of FIGS. 3A and 3B.

Advantageously, the representative model of the vibrational haptic effect is selected from a plurality of models of a library, each model being representative of a particular vibrational haptic effect.

According to a particular characteristic, the model generated from a vibrational sequence associated with the audiovisual content (for example, from an audio track, data from an acquisition via an accelerometer, etc.) from a determined document, different or not different from the audiovisual document.

The model is for example an FIR filter (Finite impulse response filter) with a number of coefficients for example equal to 128.

Naturally, the present disclosure is not limited to the embodiments previously described.

In particular, the present disclosure is not limited to a method for controlling actuator(s) but also extends to any device implementing this method and notably any devices comprising at least one CPU and/or at least one GPU.

The present disclosure also relates to a method (and a device configured) for generating haptic effects, for example implemented in a set-top box comprising a communication interface (for example an interface compliant with Ethernet and/or Wifi and/or Bluetooth standards) configured to receive video data stream and information representative of the duration of the haptic effect to be rendered and information representative of haptic coefficient(s) of an Auto-regressive filter associated with the haptic effect to be rendered and/or configured to transmit the signal(s) representative of the haptic effect to be rendered.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a (non-transitory) processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of rendering a haptic effect associated with a first audio-video sequence, wherein the method comprises:
   receiving a first information representative of a duration and a second information representative of a plurality of coefficients for programming an Auto-Regressive filter, said second information being associated with a type of haptic effect, said plurality of coefficients being determined from at least a second audio-video sequence;
   generating a signal representative of the haptic effect to be rendered, and
   inputting a white noise having a duration depending on said first information into an Auto-Regressive filter programmed with said second information.

2. The method according to claim 1, further comprising transmitting said signal to at least one haptic actuator.

3. The method according to claim 1, further comprising receiving an audio-video data stream comprising said first audio-video sequence, said first and second information being associated with at least a part of said video data stream.

4. The method according to one of claim 1, wherein said second information is selected from a library of groups of coefficients, each group being associated with a type of haptic effect.

5. A device configured for rendering a haptic effect associated with a first audio-video sequence, wherein the device comprises:
   a communication interface configured to receive a first information representative of a duration and a second information representative of a plurality of coefficients for programming an Auto-Regressive filter, said second information being associated with a type of haptic effect, said plurality of coefficients being determined from at least a second audio-video sequence; and
   a processor configured to generate a signal representative of the haptic effect to be rendered by a white noise having a duration depending on said first information into an Auto-Regressive filter programmed with said second information.

6. The device according to claim 5, wherein said communication interface is further configured to transmit said signal to at least one haptic actuator.

7. The device according to claim 5, wherein the communication interface is further configured to receive an audio-video data stream comprising said first audio-video sequence, said first and second information being associated with at least a part of said video data stream.

8. The device according to one of claim 5, wherein said second information is selected from a library of groups of coefficients, each group being associated with a type of haptic effect.

9. A non-transitory processor readable medium having stored therein instructions for causing a processor to perform at least the method according to one of claim 1.

* * * * *